United States Patent

[11] 3,586,910

| [72] | Inventor | Rudolph Stuart Sauber<br>Greenville, Mich. |
|---|---|---|
| [21] | Appl. No. | 825,615 |
| [22] | Filed | May 19, 1969 |
| [45] | Patented | June 22, 1971 |
| [73] | Assignee | White Consolidated Industries, Inc.<br>Greenville, Mich. |

[54] INTERNAL HERMETIC MOTOR PROTECTION SYSTEM
3 Claims, 9 Drawing Figs.

[52] U.S. Cl. ................................................. 317/13,
310/71, 317/40, 339/126
[51] Int. Cl. ......................................... H02h 7/08
[50] Field of Search ......................................... 174/50, 54,
52; 317/15, 13, 40; 310/71, 68.3, 66, 67, 89;
339/126

[56] References Cited
UNITED STATES PATENTS

| 2,094,386 | 9/1937 | Veinott .................. | 175/294 |
| 3,012,159 | 12/1961 | Druesedow............... | 310/71 |
| 3,293,519 | 12/1966 | Dresser ................... | 318/221 |
| 3,350,587 | 10/1967 | Turk........................ | 310/71 |
| 3,351,790 | 11/1967 | Linkous.................... | 310/68 |
| 3,482,146 | 12/1969 | McMorrow et al. ...... | 317/13 |

Primary Examiner—J. D. Miller
Assistant Examiner—Harry E. Moose, Jr.
Attorney—Strauch, Nolan, Neale, Nies and Kurz ABSTRACT: A hermetic motor protection system employing a current-temperature protection device in circuit with the motor and mounted internally of the motor shell directly on fixed terminal plugs sealingly extending through the motor shell, the protection device being part of a novel terminal and protection assembly which is readily accessible within the shell.

PATENTED JUN22 1971 3,586,910

INVENTOR

RUDOLPH S. SAUBER

BY Strauch, Nolan, Neale, Nies & Kurz

ATTORNEYS

INVENTOR

RUDOLPH S. SAUBER

BY Strauch, Nolan, Neale, Nies & Kurz

ATTORNEYS

INTERNAL HERMETIC MOTOR PROTECTION SYSTEM

BACKGROUND OF THE INVENTION

This invention relates generally to a current-temperature protection system for a hermetic motor compressor unit of a refrigeration system. More particularly, the invention is directed to a novel protector assembly mounted internally of the motor compressor shell on the electrical terminal plugs extending through the shell and conventionally hermetically sealed thereto.

Various protection systems have been employed in the past to protect refrigeration motor-compressor units against current and temperature overload conditions. One system commonly used employs a current temperature responsive protection device and an associated relay which are mounted externally of the compressor shell, with the protection device generally being urged into thermal conductive contact with the shell to make it responsive to temperature conditions within the shell. Also, the protection device and relay are commonly housed within a cover box to reduce electrical hazard and suppress the circulation of ambient air about the protection device which would upset the critical thermal balance needed for adequate protection of the compressor motor.

The above-described conventional system suffers various disadvantages in that the externally mounted protection device does not accurately sense the hermetic compressor operating temperatures within the shell, special provision must be made to suppress movement of ambient air over the protective device, the relay has a tendency to overheat because of the lack of cooling air flow therearound, the device ordinarily is field tested rather than factory tested since it may be accidentally readjusted or damaged during transport, and because of the above, manufacturing and repair costs tend to be excessive.

Another more recent hermetic motor protection system employs a hermetic current-temperature protection device located directly in the windings of the compressor motor. While this system is quite effective in operation, it necessitates specially designated, complex motor assemblies which, of course, are substantially more expensive than standard compressor motors. In addition, if the protection device malfunctions, replacement of the device entails a major repair operation.

SUMMARY OF THE INVENTION

Accordingly, a primary object of the invention resides in the provision of a novel hermetic current-temperature protection assembly mounted internally of a hermetic motor compressor unit, the assembly being positioned to quickly and accurately respond to motor temperature conditions and to be readily accessible and replaceable should the need arise.

Another object resides in the provision of a novel current-temperature protection assembly for a hermetic motor compressor unit, the assembly being internally mounted directly on the readily accessible electrical plugs or terminals which extend through and are electrically insulated from the compressor shell.

Still another object resides in the provision of a current-temperature protection system for a hermetic motor housed in a shell, the system comprising a current-temperature responsive device mounted directly internally on the electrical plugs passing through the shell to cause the device to rapidly respond to operating temperatures of the motor and also to enable it to be quickly and easily replaced. The device is electrically in circuit with the common conductor to the motor windings, thereby deenergizing the motor upon an overload of current and/or an excessive motor operating temperature.

A further object resides in the provision of a novel internal terminal assembly for a hermetic motor compressor unit comprising a plurality of terminal plugs mounted on and extending through the housing shell of the unit, an enclosure for receiving the socket ends of conductors leading to the motor primary and secondary windings, and a motor protection device mounted on but externally of the enclosure, the device being electrically in circuit with and supported from a socket within the enclosure which mates with one main supply terminal common to both windings. In this manner, the protection device is positioned within the shell to respond to operating temperatures of the motor and is in the common lead line to the motor windings to prevent excessive current from flowing therethrough and causing motor damage.

Still a further object resides in the provision of a terminal assembly for a hermetic motor including a plurality of plugs which extend through the motor housing shell to provide internal and external ends, a socket enclosure and protective device as above-described mounted on the inner ends of the plugs, and a relay in circuit with the motor windings mounted on the outer ends of the plugs, the relay being exposed to the flow of ambient air therearound to thereby cool the relay during energization thereof.

Further objects and advantages will become evident from reading the detailed description of the invention which follows, with only the appended claims defining and limiting the scope thereof.

DETAILED DESCRIPTION OF THE INVENTION

Figure 1:
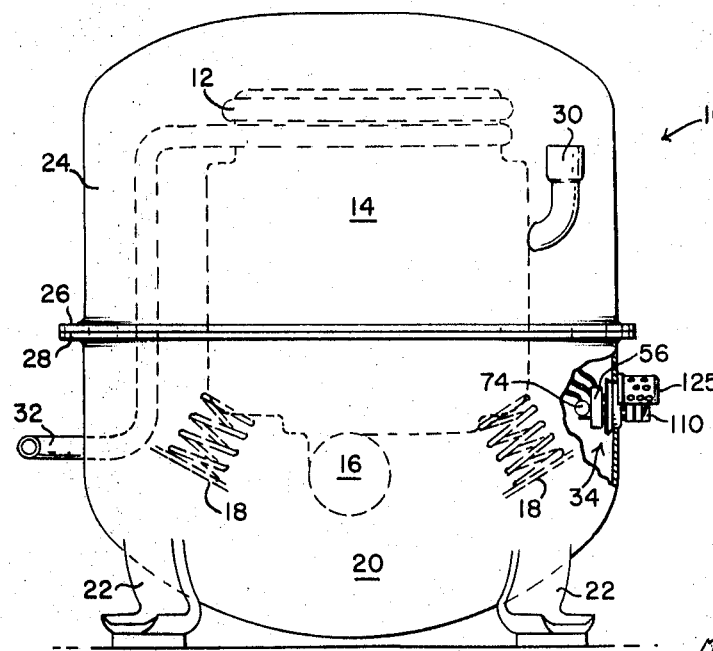
FIG. 1 is a fragmentary elevational view of a motor compressor unit having the current-temperature protection assembly of the invention mounted internally of the unit shell directly on the inner ends of the terminal plugs and a relay on the outer ends.

Referring now to the drawings, the basic components of the refrigerant compressor assembly 10 are of conventional construction and include a motor-compressor unit 12 having an upper motor section 14 supporting a lower compressor section 16. The entire unit is supported on spring bracket assemblies 18 connected to the inner wall of lower shell 20 mounted on a base by legs 22. An upper shell 24 hermetically seals unit 12, the upper and lower shells being welded or otherwise sealingly connected together around their cooperating peripheral flanges 26 and 28.

As is conventional, in a refrigerator, air conditioner, or similar system, compressor assembly 10 receives refrigerant from one side of an evaporator by way of conduit 30, compresses the refrigerant, and delivers the compressed refrigerant by way of conduit 32 to a condenser.

The motor 14 is also conventionally cycled on and off by a thermostat positioned in a room or other space to be cooled by the unit.

Figure 2:
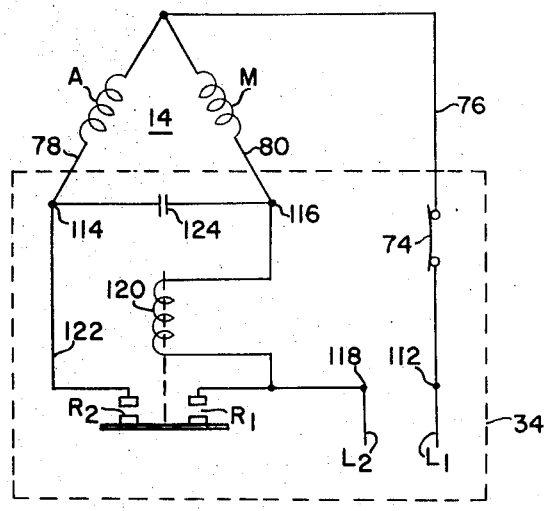
FIG. 2 is a schematic of a typical motor circuit incorporating the protection device in the common lead to the primary and secondary windings of the motor.

In order to protect the motor against excessive current and temperature operating conditions, a circuit protection assembly 34 is mounted directly on lower shell 20 and, as shown in FIG. 2, is connected in circuit with the auxiliary and main motor windings A and M, respectively.

Figure 5:
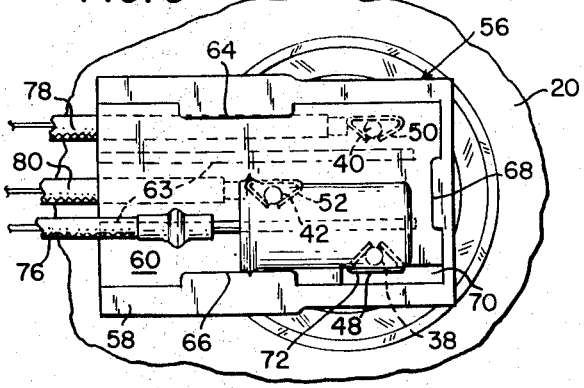
FIG. 5 is an plan view of the assembly of FIG. 3.
Figure 3:
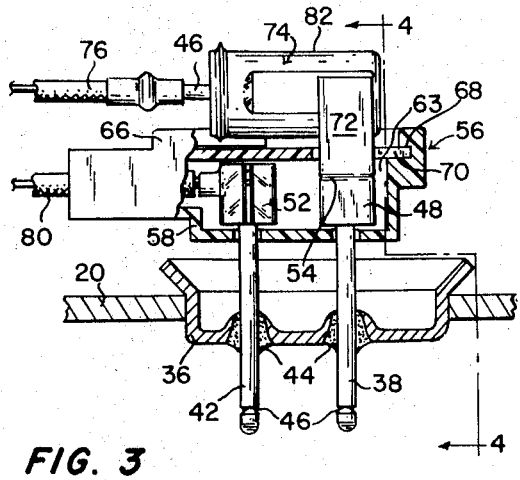
FIG. 3 is a fragmentary, partially sectioned view illustrating the terminal motor protection assembly directly connected to the terminal plugs with the protection device mounted externally of the socket enclosure.
Figure 4:
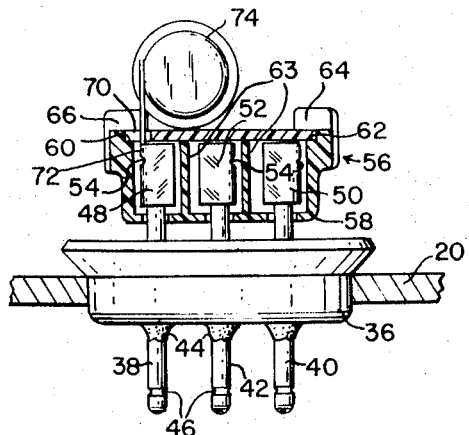
FIG. 4 is an elevational view along line 4–4 of FIG. 3.

As illustrated in FIGS. 3—5, assembly 34 comprises a metal terminal plate 36 welded or otherwise hermetically sealingly secured in an opening in lower shell 20 and having three equiangularly spaced terminal plugs 38, 40 and 42 extending therethrough and electrically insulated therefrom by the glass fused sections 44. The inner and outer ends of each of the plugs have annular grooves 46 for a purpose described below.

A plurality of female terminal sockets or clips 48, 50 and 52 are mounted on the inner ends of respective plugs 38, 40 and 42, each of the clips having an indented spring strip 54 which snaps into the annular plug groove 46 to hold the clips normally firmly in place but still permit their removal if desired.

Clips 48, 50 and 52 are housed within a two piece Bakelite insulating housing 56 having a base member 58, the bottom wall of which is suitably apertured to receive plugs 38, 40 and 42 to permit simultaneous connection and disconnection clips of 48, 50 and 52 from their respective cooperating plugs.

A removable cover plate slidably engages base shoulders 60 and 62 and integral divider strips 63 and is retained thereon by overlapping side flanges 64, 66 and end flange 68. The cover plate also prevents clips 48, 50 and 52 from disengaging from their respective plugs and has a slotted corner section 70 overlying a portion of clip 48 to receive an outwardly extending conductive support strip 72 integral at its inner end with clip 48 within housing 56 and conductively integrally secured as by welding at its outer end to the metallic housing 82 of a current-temperature protection device 74 located externally of housing 56 within shell 20.

A common main lead 76 extends from device 74 to the main and auxiliary windings of the motor 14. A pair of leads 78,80 are connected to clips 50, 52 respectively within housing 56 and lead through the back end of the housing respectively to the auxiliary and main motor windings A and M.

Figure 6:
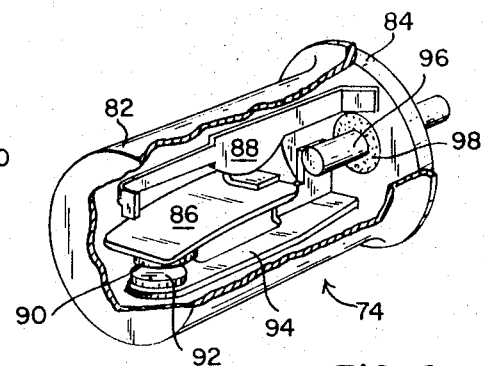
FIG. 6 illustrates a typical metal can protection device useful in the invention.

Protection device 74 is of conventional construction and may be a metallic can type device shown in FIG. 6 comprising a metal housing 82 integrally connected to a metal end cover 84. A bimetal 86 is cantilevered from a metallic support 88 connected to cover 84 and has at its free end a contact 90 which cooperates with a stationary contact 92 on the end of a conductive strip 94 connected to pin 96 which extends through and is electrically insulated from cover 84 at 98.

As indicated above, support strip 72 is secured to can housing 82 and common lead 76 is connected to pin 96 to normally deliver current from terminal clip 48 through housing 82, cover 84, bimetal 86, strip 94, pin 96, and lead 76 to the motor windings.

It is to be noted that protection device 74 is readily responsive to the operating temperature of motor-compressor unit 12 since it is mounted internally within shell 20 and is directly subjected to the temperature conditions therein. Thermally conductive housing 82, cover 84, support 88, and bimetal 86 respond directly to temperature changes and break contacts 90 and 92 when a predetermined excessively high operating temperature exists.

Figure 7:
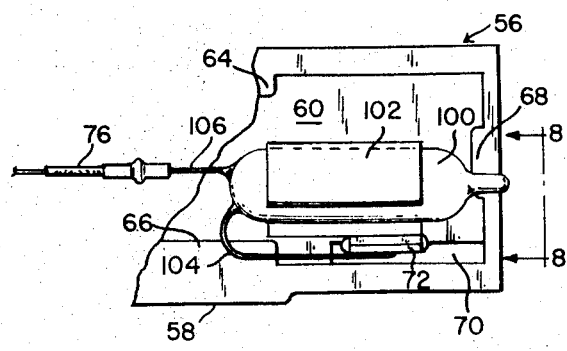
FIG. 7 is a plan view similar to FIG. 5, but illustrating a glass envelope protector which may be used instead of the metal can protector of FIG. 6.
Figure 8:
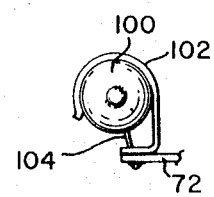
FIG. 8 is a view along line 8–8 of FIG. 7.

Instead of using a metal cover protector such as that shown in FIGS. 3-6, a glass envelope protector 100 shown in FIGS. 7 and 8 may be employed. The glass envelope houses a bimetal assembly similar to that shown in FIG. 6 and is supported by an encircling metallic spring clip 102 conductively secured to support strip 72 which is connected to the bimetal by a lead 104 which extends through the glass envelope. Another lead 106 extends from a stationary contact out from the glass envelope and connects to the motor lead 76.

The glass envelope protector 100 functions in the same manner as protector 74, with the envelope and metal spring clip 102 directly sensing the thermal conditions existing in shell 20.

Figure 9:
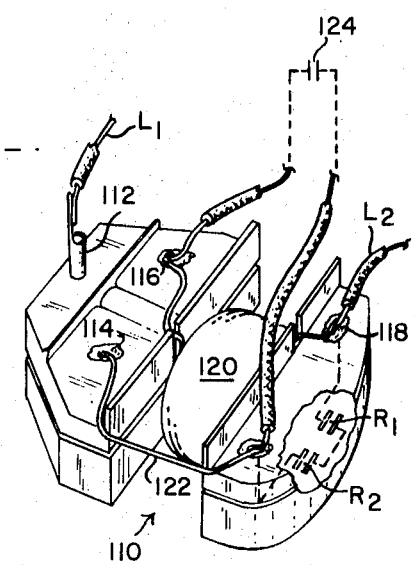
FIG. 9 is a perspective view of the relay illustrating the various line connections to the relay.

Referring now to FIGS. 1 and 9 a relay 110, having three equiangularly spaced sockets terminating in terminal connections 112, 114 and 116 is mounted outside shell 20, with the sockets placed respectively on the outer ends of plugs 38, 40 and 42 so that the main common supply line L1 is connected directly to plug 38 through relay terminal 112. The other main supply line L2 is connected to a relay terminal 118 which passes current through relay coil 120 to terminal 116 and through plug 42 to lead 80 and onto the main motor winding M. A conductor 122 extends from relay contacts R, and R to relay terminal 114 to pass current through plug 40 and lead 80 to the auxiliary motor winding A. A capacitor 124 is connected across coil 120 between terminal 116 and contact $R_2$.

A cover 125 connected to shell 20 may be provided for relay 110 to protect against electrical hazards and shock. However, the cover should be perforated as shown or otherwise constructed to permit ambient air flow over the relay to cool it during operation.

Hence, it is apparent that the invention as described accomplishes the objects and provides the advantages initially set forth above. The motor protection system is located within the hermetic shell and is directly responsive to temperature conditions therein. It is mounted and supported on the terminal plugs on the shell, thus rendering it readily removable and accessible for repair if such becomes necessary. It may be used with lower cost, conventional motors, and its associated relay which is mounted externally of the shell operates under more suitable cooler temperature conditions. In addition, because the protection device is mounted within the shell, it may be factory assembled and tested without fear of damage during transport and mounting in the field.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desired to be secured by Letters Patent is:

1. In a hermetic motor encased in a shell, first terminals mounted on said shell, a terminal housing located within said shell, second terminals in said housing removably connected to said first terminals, and cooperating therewith to deliver electrical energy through conductors to said motor, a conductive strip connected to one of said second terminals and extending outwardly through said housing, a casing mounted on said strip externally of said housing and within said shell, a bimetallic switching assembly within said casing connected in circuit with said one of said second terminals through said metallic strip, said bimetallic switching assembly being normally closed, and being opened in response to an increase in temperature within said shell to thereby deenergize said motor in response to excessive temperature within said shell.

2. In a hermetic motor encased in a shell, first terminals mounted on said shell, a housing within said shell, second terminals within said housing removably connected to said first terminals and cooperating therewith to deliver electrical energy through conductors to said motor, a conductor strip connected to said one of said second terminals and extending outwardly through said housing, and motor protection means mounted on said strip in electrical circuit therewith, said motor protection means functioning to protect said motor against excessive current and temperature operating conditions, and relay means mounted on said first terminal externally of said shell, said relay means being cooled by ambient air when energized during operation of said motor.

3. An electric motor protection system comprising an electric motor compressor unit mounted in a hermetically sealed shell, a terminal assembly sealingly extending through said shell and having external connector portions adapted for connection to a power source and internal connector portions, a housing within said shell and containing terminals adapted for connection to said internal connector portions and cooperating therewith to conduct electrical energy through conductors to said motor, a conductor strip associated with one of said terminals and extending outwardly of said housing, a casing carried by said strip externally of said housing and within said shell, a bimetallic switch assembly within said casing connected in series with said strip, said casing and the conductor leading to said motor, said bimetallic switch assembly normally being closed and being opened when the temperature within said shell reaches a predetermined level to thereby protect said motor against excessive heat.